United States Patent
Barkan et al.

(10) Patent No.: US 6,216,116 B1
(45) Date of Patent: Apr. 10, 2001

(54) SYSTEM AND METHOD FOR HANDLING PERMITS

(75) Inventors: Yuval Barkan; Moromay Barkan, both of Petah Tikva (IL)

(73) Assignee: Diversinet Corp., Toronto (CA)

( * ) Notice: Subject to any disclaimer, the term of this patent is extended or adjusted under 35 U.S.C. 154(b) by 0 days.

(21) Appl. No.: 09/292,088

(22) Filed: Apr. 14, 1999

Related U.S. Application Data

(63) Continuation of application No. PCT/IL98/00380, filed on Aug. 13, 1998.

(30) Foreign Application Priority Data

Aug. 14, 1997 (IL) ........................................................ 121550

(51) Int. Cl.⁷ .................................................. G06F 17/60
(52) U.S. Cl. ................................ 705/76; 705/80; 705/13; 705/54; 713/156; 713/158; 713/169; 713/175; 713/176
(58) Field of Search ..................................... 705/76, 80, 5, 705/13, 59, 54, 57, 58; 713/155, 156, 157, 158, 166, 169, 175, 176, 167; 340/825.31, 825.34; 235/382

(56) References Cited

U.S. PATENT DOCUMENTS

| | | | | |
|---|---|---|---|---|
| 4,816,655 | * | 3/1989 | Musyck et al. | 713/176 |
| 4,868,877 | * | 9/1989 | Fischer | 713/157 |
| 5,214,702 | * | 5/1993 | Fischer | 713/157 |
| 5,261,002 | * | 11/1993 | Perlman et al. | 713/156 |
| 5,315,657 | * | 5/1994 | Abadi et al. | 340/825.31 |
| 5,339,403 | * | 8/1994 | Parker | 713/156 |
| 5,412,717 | * | 5/1995 | Fischer | 713/156 |
| 5,412,727 | * | 5/1995 | Drexler et al. | 705/76 |
| 5,455,953 | * | 10/1995 | Russell | 713/155 |
| 5,475,758 | * | 12/1995 | Kikuchi | 713/156 |
| 5,542,046 | * | 7/1996 | Carlson et al. | 340/825.34 |
| 5,615,268 | * | 3/1997 | Bisbee et al. | 713/176 |
| 5,659,616 | * | 8/1997 | Sudia | 705/76 |
| 5,694,471 | * | 12/1997 | Chen et al. | 705/76 |
| 5,754,654 | * | 5/1998 | Hiroya et al. | 705/76 |
| 5,757,920 | * | 5/1998 | Misra et al. | 705/76 |
| 5,761,309 | * | 6/1998 | Ohashi et al. | 713/156 |
| 5,784,463 | * | 7/1998 | Chen et al. | 713/156 |
| 5,872,848 | * | 2/1999 | Romney et al. | 713/176 |
| 5,901,284 | * | 5/1999 | Hamdy-Swink | 713/155 |
| 5,903,882 | * | 5/1999 | Asay et al. | 705/76 |
| 5,943,423 | * | 8/1999 | Muftic | 705/76 |
| 5,960,085 | * | 9/1999 | de la Huerga | 340/825.31 |
| 5,978,484 | * | 11/1999 | Apperson et al. | 705/54 |
| 6,003,014 | * | 12/1999 | Lee et al. | 705/13 |

OTHER PUBLICATIONS

Backman, Dan, "Smartcards: The Intelligent Way to Security", Network Computing, vol. 9, Issue 9, p. 168 (3 pages), May 15, 1998.*

* cited by examiner

*Primary Examiner*—Emanuel Todd Voeltz
*Assistant Examiner*—John W. Hayes
(74) *Attorney, Agent, or Firm*—Dinesh Agarwal, P.C.

(57) ABSTRACT

A method for handling permits, comprising the steps of: (A) a gatekeeper presents a gatekeeper's permit including an authorization to ask for a user's permit; (B) a user checks the validity of the gatekeeper's permit. If the permit is valid, then go to step (C), else END; (C) the user presents a user's permit and a user's certificate; (D) the gatekeeper checks the validity of the user's permit and certificate, and the correspondence therebetween, and performs a predefined action if the result of the validity check is positive. The user's permit further includes a HTML (HyperText Markup Language) stamp, to allow automatic permit verification.

8 Claims, 6 Drawing Sheets

SYSTEM AND METHOD FOR HANDLING PERMITS

CROSS-REFERENCE TO RELATED APPLICATIONS

This application is a continuation to the applicant's application No. 121550 filed on Aug. 14, 1997 in Israel and entitled "SYSTEM AND METHOD FOR HANDLING PERMITS", and the subsequent PCT application No. PCT/IL98/00380 filed on Aug. 13, 1998 and having the same title.

FIELD OF THE INVENTION

The present invention relates to systems for handling permits. More particularly, the invention relates to such systems with means for issuing permits and using permits to conditionally allow entry to restricted areas or the performance of specific activities, using encrypted digital messages, or declarative permits.

BACKGROUND OF THE INVENTION

At present, various systems are used to control access to restricted areas. One type of access control system uses hardcopy, printed entry passes, issued by a body authorized to do so.

One problem with these entry passes is the coordination between the various departments of a large organization, as to which body has the authority to approve the issuance of the pass, and which body actually issues it.

As circumstances change, passes have to be changed or canceled. In present systems, there may be difficulty in responding to these needs.

Another problem with existing systems is the use of one digital document to include both the identification of the user, and their permits. The identification for a particular person is fixed, whereas their permits change as new permits are added and old permits are canceled. Thus, the use of one document to hold both the identification and permits information may prove cumbersome or not suitable to real life requirements. The issuer of a permit may be required to identify the recipient, which may be difficult sometimes, for example when the permit is issued to a remote user like in Internet.

Moreover, since the identification and the various permits are issued by distinct, separate authorities, changing the document may be difficult or impractical.

One has to accept that, in real life, there may be permits being issued without the required authority. There is a need to have the capability to trace each permit to its source, to ascertain that the permit issuance was legitimate.

Still another problem in present systems is the possible disclosure of the existence and/or contents of a confidential permit in a certificate, in case the permit holder is challenged by an impostor or someone who has no authorization to ask for that permit. For example, an ATM machine which was tampered with, to deliver the details of credit cards with the PIN to their non-legitimate operator.

The use of certificates issued by a center was disclosed in my prior patent applications, No. 113259 (Israel), No. 08/626,571 (U.S.A.) and 96105258.6 (E.P.O.). The certificates there were used by each party to prove their identity and to exchange encryption keys, prior to a secure communication session.

At present, when E-mail or other electronic document is received, one cannot tell whether it originated at a specific firm.

This feature was available with paper documents, since these documents carried a letterhead with the details of the firm where the letter originated.

Prior art patents apparently do not solve the abovedetailed problems.

Thus, Fischer U.S. Pat. No. 5,412,717 discloses a computer security method and apparatus having program authorization information data structures.

The system includes a monitor which limits the ability of a program about to be executed to the use of predefined resources. The monitor processes a data structure including a set of authorities defining that which a program is permitted to do. The program authorization information in Fischer refers to a situation wherein programs are obtained from untrustworthy sources, and its purpose is to protect a user from any program to be executed. Fischer includes means to protect from computer viruses. An interpreter verifies that the functions encountered in a program are in fact permissible.

Bisbee et al., U.S. Pat. No. 5,615,268 discloses a system and method for electronic transmission, storage and retrieval of authenticated documents. Bisbee provides means for achieving a verifiable chain of evidence for digital documents, that cannot be repudiated. The system ensures the authenticity of digital documents. The digital document can be transmitted electronically to another party, whereby the system ensures the integrity of the document and the non-repudiation of the document. Moreover, Bisbee verifies the authority of the party requesting the authenticated electronic document. The electronic document is signed with a digital signature.

It is an objective of the present invention to address the problems of the issuance and use of permits.

SUMMARY OF THE INVENTION

According to the present invention, there is provided a system and method for issuing permits and for using these permits to conditionally allow entry to restricted areas or the performance of specific activities, using encrypted digital messages. The permits are handled separately from certificates, in a modular system.

The issuer of a permit may issue a permit without identifying the recipient, since the separate certificate held by a user is used to identify him/her for the purpose of that permit.

In accordance with the invention, the object is basically accomplished using a system for handling permits which includes (1) means for reading a certificate, (2) means for reading a permit, and (3) decision means for performing a predefined activity based on the results of the combined verification of the certificate and the permit. The decision means may include storage means for the various parameters and routines to be used in the system.

It is another object of the present invention to grant access to users based on a dual check—the certificate to identify the pass holder, and the permit to allow a specific activity to that certificate holder. The certificates and permits are issued by an authority after performing the checks on each persons and according to routines specific to each location and circumstances. Thus, the security level of the permit and/or certificate are adapted to suit the requirements of each issuer of these digital documents.

Still another feature of the present invention is the traceability to source of each permit. Each permit includes as attachment the authorization to issue that permit, from a higher authority. The authorization includes the digital signature of that authority, to attest to the legitimacy of that permit issuance. The method facilitates the coordination between the various departments of an organization, with regard to permits issuance and handling thereof. All the permits in an organization may be based on an established final authority there, whose digital signature and/or identity is recognized by all those involved with permits in that organization or entity.

The gatekeeper to which a permit (entry pass) is to be presented, is optionally issued their own permit, a permit to ask for the entry pass permit.

This novel method addresses the danger of disclosing the existence of the permit, in case the permit holder is challenged by an impostor.

Permits may be used not only to gain entry to restricted areas, but also to perform specific activities. These permits may then include details relating to the permit holder and their permitted activities.

Permit technology as disclosed in the present invention may be used to provide "electronic stationery" or "electronic paper", to indicate in electronic form where the E-mail or other electronic document originated. A possible problem related to the use of permits is their use in a way exceeding the limitations set up by the issuing authority. Assuming that a user B is given an authorization to issue 100 entry permits to a laboratory, how can one verify that user B did not exceed his mandate limit by issuing more than 100 entry permits? Accordingly, the present invention discloses a method for supervising the users who were given a permit, to ensure that the limitations of that authorization are not exceeded.

Further objects, advantages and other features of the present invention will become obvious to those skilled in the art upon reading the disclosure set forth hereinafter.

BRIEF DESCRIPTION OF THE DRAWINGS

The invention will now be described by way of example and with reference to the accompanying drawings in which.

DETAILED DESCRIPTION OF THE PREFERRED EMBODIMENTS

Figure 1:
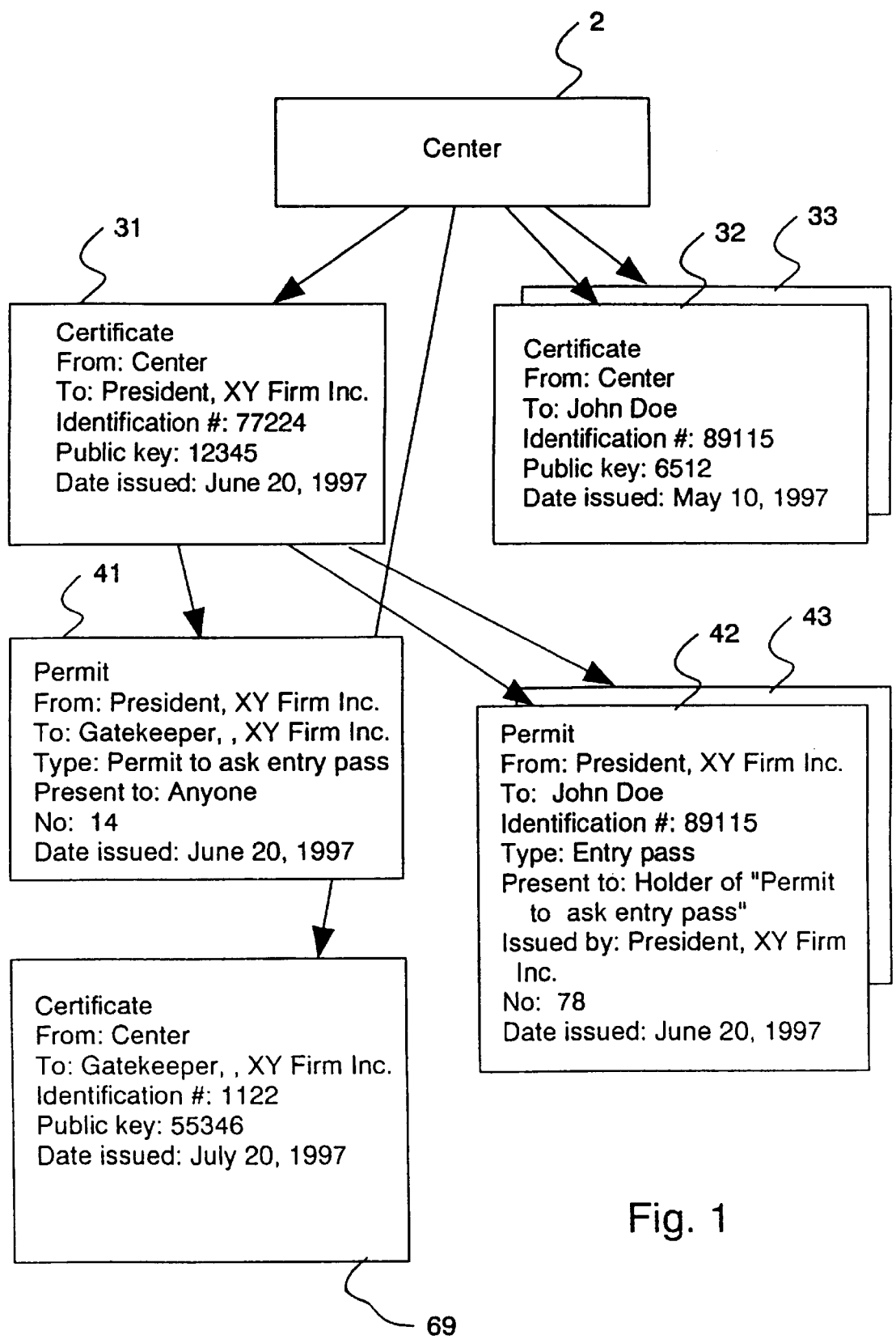
FIG. 1 illustrates a hierarchical method for issuing certificates and permits in a simple application

A preferred embodiment of the present invention will now be described by way of example and with reference to the accompanying drawings. FIG. 1 illustrates the issuance of certificates 31, 32, 33 by center 2, and the subsequent issuance of permits 41, 42, 43 based thereon.

According to the system and method hereby disclosed, there are provided means for separate handling of certificates, permits and encryption keys.

Certificates relate to the identity of the holder of that certificate. A certificate is issued by a center and includes some information relating to that person, like a name or nickname, with a public key assigned to that person, and optional additional information. Certificates may be used by each party to prove their identity and to exchange encryption keys, prior to a secure communication session.

Permits as disclosed in the present invention have a different use than the above certificates: the permits are used to authorize specific actions, as detailed in each permit. In another embodiment, a permit may be used to hold a declaration or statement, for example a statement indicating that a nickname belongs to a specific person, or that an ID (identification number) corresponds to a specific person. That person may be known to the public or designated by his/her name and address for example. This supports a method wherein the rest of the permits relate to that nickname or ID, not to a specific, known person. That person may claim the benefits of the permits by presenting the permit linking that nickname or ID with himself.

For example, permits may be used to conditionally allow entry to restricted areas or the performance of specific activities, using encrypted digital messages.

Permits may include, for example, declarations or statements or limitations, as the need may be.

A permit may contain any text and/or picture and/or a message in a multimedia environment, and/or a permission to issue secondary permits. Other medium may be used as the technology enables it, for example DNA fingerprints to allow access.

The dual use of certificates and permits according to the present invention enables an issuer of permits to grant a permit without identifying the recipient, since the separate certificate held by that user is used to identify him/her for the purpose of that permit. The certificate was issued in a transaction which included that user's identification. This allows permits to be issued in situations where user identification may be difficult, for example when the permit is issued to a remote user like in Internet.

A permit may include various conditions for its use, for example a requirement that another specific permit be presented as well. For example, a person X1 may give a permit to a second person X2 to drive her car, with the condition that the permit be valid only if person X2 has a driving license. The driving license is another permit, issued by another authority.

The above issuance of permits without user identification is preferably used only when the permit itself is not confidential. If the permit itself is confidential, that is the permit issuer desires that the existence of the permit itself not be disclosed to unauthorized parties, then a different method is used, which includes user identification. This allows the permits issuer to prevent a possible situation where an unauthorized person be delivered a permit he/she was not untitled to receive and/or read, thus disclosing the existence of that permit.

In case where the permit is not confidential, it is still possible to use a method including the recipient identification, if that is possible and/or desirable to the permits issuer.

The permits may use the infrastructure of certificates and key dissemination centers, as disclosed in my prior applications.

Center 2 includes means for encryption key dissemination among users of the system, as detailed in my prior patent applications. This is accomplished at center 2 by issuing certificates, like certificates 31, 32, 33 , each including the identification and public key for a user. Each certificate is attested to using the private key of the center.

A hierarchical tree of centers (not shown) may be used in lieu of a single center. Each center draws its authority from the center higher in the tree. This is implemented with certificates/authorization passing down the tree branches, starting from the root (the main center). Thus, a certificate issued by a center in that hierarchy will be recognized by the other centers or users communicating with these centers. Thus, a center like center 2 issues certificates to each gatekeeper at XY Firm Inc., to identify the gatekeeper and/or each location there. For example, the gatekeeper at the Computers Lab is issued certificate 69.

Any user related to any center in the hierarchical structure may issue permits as desired.

Certificates and permits may be attested to using one of two possible methods: either the document is encrypted with the private key of the issuer, or a digital signature is added to the document, with the document itself not being encrypted.

Throughout the present disclosure, although only encryption of certificates and permits may be detailed, it should be understood that either encryption or digital signature of these documents is possible.

The first method may include encryption of the certificate with the private (secret) key of center 2. Since the public key of center 2 is known, anyone can decrypt the certificate with that public key to read the public key of a user, with the successful decryption being proof of the center 2's signature on that certificate.

It is very difficult to tamper with the certificate, since that would require the knowledge of the secret key of center 2. Similarly, it would be very difficult to create new, false certificates, for the same reason.

Moreover, it is possible to encrypt only part (or several parts) of a permit. Part of a permit may be encrypted with the public key of a recipient. In that case, only the intended recipient can read that part of the permit, using their private corresponding key. There is no need to indicate the identity of the recipient of that part of the permit since the permit will be presented to them eventually and since they have the corresponding key, the recipient will be able to read it.

Several parts of the permit, intended each to a different recipient, may each be encrypted with the public key for that recipient. The encrypted parts may include permits to perform an activity or related information, that is information about that permit and/or the permit holder.

Digital signature may include the computation of a hash of the certificate or permit, and encryption of the hash thus obtained with the private key of the center (for certificates) or the private key of the permit issuer (for permits). A hash is the result of a numerical computation on the contents of a file or text, resulting in a digital block of fixed length, for example 128 or 512 bytes or bits.

An advantage of this approach is that a smaller computational effort is required, that is encryption/decryption is performed only to ensure the validity of the certificate or permit, when these are otherwise acceptable. For example, a student searching for the Computer Lab may read certificates for Physics Lab, Chemistry Lab which are not relevant to him, but only indicate that that is not the desired location. Only when he arrives at the desired laboratory, he will check the signature there to ensure that that is indeed the Computer Lab.

The public key of XY Firm Inc., thus established with certificate 31, can then be used to create permits 41, 42, 43 at that facility. The purpose of the permits 41, 42, 43 is to allow various activities within XY Firm, or control the activities therein to include only those activities which authorities at XY Firm declared to be legitimate.

The invention is now detailed with methods which exemplify specific embodiments thereof.

Method 1

Issuance of permit 41 to gatekeepers

A. Authorities at XY Firm generate a message for a permit, which includes data items as follows:

1) Who issued that permit. In this example, this is the President of XY Firm (this allows to track permit to source);

2) To whom was the permit issued. In the example, it was to Gatekeeper (this allows to track flow of permits in a hierarchy, and also to identify the permit holder according to its certificate, if necessary );

3) Type of permit. What is the action that is allowed by the permit. In the example, it is to ask entry pass from people asking to gain access to that facility;

4) To whom it is to be presented. The very existence of a permit and/or the activity related therewith, may be secret, or restricted. In the present example, there are no restrictions to the presentation of the gatekeeper's permit, thus the permit may be presented to anyone.

B. a person authorized to issue permits then encrypts the message prepared in step (A) above using the private key assigned to that person, to create the permit 41. That person was authorized by the president to issue permits;

C. permit 41 is delivered to the gatekeeper. End of method.

Notes:

1. "Authorities" in step (A) above are meant to include the president of the firm or some other person authorized by the president, or a machine (like a computer) set up to perform these activities. In any case, that authority will have possession of the private (secret) key for that facility. This is the secret key corresponding to the public key for XY Firm. The public key for XY Firm is included in certificate 31. See below—a description of the authorization method within an organization.

2. The permit 41 may be issued to a person who serves as gatekeeper, or may be included in a machine (like a card reader) located at the entry point, that is the entrance to XY Firm.

3. The permit 41 may include additional, optional data items, for example (numbers are in continuation to these in step (A) above):

5) Serial number of permit. This may be used where there is a limitation in the number of permits which can be issued. The permits may be verified to ensure that each has a different number, and not to exceed the allowed quota.

6) Date issued. There may be a time limitation to the permit, either explicit or inherent. The date allows to check the validity of the permit in that respect.

Moreover, where two permits are available, then one can ascertain which is the most reliable or updated.

7) Expiration date. Allows to limit the validity period of the permit, so that permits which are not updated become automatically obsolete.

8) Update time, that is when the permit was actually given to user.

9) Additional optional information. This is an open list. The permit issuer has the option to add additional information as the need be.

An authorization method within an organization

In any organization, firm or other entity there is an established final authority there. The digital signature of that authority is recognized by all those involved with permits in that organization or entity. Permits are issued either directly or indirectly by that authority. In the first case, a permit is signed by the final authority, whereas in the latter case a permit is signed by another person who has been authorized by the final authority to do so.

The authorization structure may include several levels, with a permit being issued by someone who has a permit to do so from a higher authority, and so on, up to the highest level where there is the final authority for that organization, firm or entity.

All those involved with permits in that organization are given either the public key of that final authority, or means for getting that public key when there is a need to do so. Holders and users of permits may be given means to receive the public key of the final authority there, based on the identification of that known and accepted final authority. This method enables that final authority to change their key pair as required.

Throughout the present disclosure, an indication of an authority to issue permits or an authorization thereof is meant to refer to the above method of authorization.

Method 2

Issuance of entry permit 42, 43 to employees

A. Authorities at XY Firm approve the issuance of an entry permit 42 to a specific employee, after that employee was identified with their certificate 32 and following some decision routine at that firm. Each employee, at his/her first arrival there, may check the identity of XY Firm ("did I arrive at the right location?") using certificate 31 for the gatekeeper, and optionally comparing with the certificate at center 2.

The gatekeeper has a certificate from a center and a permit to ask, as the representative of the firm, for the entry pass;

B. Authorities at XY Firm generate a message for a permit, which includes data items as follows:

1) Who issued that permit. In this example, this is the President of XY Firm (this allows to track permit to source);

2) To whom was the permit issued. In the example, this is an employee, identified by his/her certificate 32. The data item includes the name and/or pseudonym for that employee, together with their identification details as found in their certificate 31. This allows to track flow of permits in a hierarchy, and also to use the permit together with that employee's certificate. The permit thus creates the logical link between the certificate holder and their allowed activity;

3) Type of permit. What is the action that is allowed by the permit. In the example, it is an entry pass to XY Firm facilities;

4) To whom it is to be presented. The very existence of a permit and/or the activity related therewith may be secret, or restricted on a need to know basis.

For example, the authority of an employee of the bank to draw cash from the vault may make him/her vulnerable to blackmail or pressure by criminal gangs, if that permit became common knowledge. The protection of these employees is the confidential status of their permits.

For example, an entry pass to the XY Firm will be presented to the gatekeeper at the main entrance, whereas an entry pass to the vaults will be presented only to the gatekeeper of the vaults.

The controlled presentation of a permit also addresses the danger of that permits' disclosure if presented to an impostor.

Thus, the present invention addresses the possibility that an impostor may try to gain knowledge of the existence of the permit.

In the embodiment in the present example, the permit may be presented only to the gatekeeper, that is a person or machine capable of presenting the "Permit to ask entry pass" permit, that is permit 41;

C. authorities encrypt the message prepared in step (B) above using the private key for that facility, to create the permit 42;

D. permit 42 is delivered to the employee who was identified with his/her certificate 32, and whose details from that certificate are included in the permit 42 as detailed in step (B)(2) above. End of method.

Notes:

1. The permit 42 may include additional, optional data items, for example (numbers are in continuation to these in step (B) above):

5) Serial number of permit. This may be used where there is a limitation in the number of permits which can be issued.

The permits may be verified to ensure that each has a different number, and not to exceed the allowed quota.

6) Date issued. There may be a time limitation to the permit, either explicit or inherent.

7) expiration date. Allows to limit the validity period of the permit, so permits become automatically obsolete if not updated.

8) additional optional information. This is an open list, with the permit issuer having the option to add additional information as the need be.

The date allows to check the validity of the permit in that respect. Moreover, where two permits are available, then one can ascertain which is the most reliable or updated.

2. The same person, identified by certificate 32, can hold multiple permits: he/she may hold an entry permit 61 (see FIG. 2) to XY Firm, as an employee there; they may also hold an entry permit (not shown) to a facility at an university, if they are a student there as well. Additionally, the same person may hold an entry permit to the building where they live.

3. The permits are issued by an authority after performing the checks on each persons and according to routines specific to that location and the circumstances. The authority to issue permits was detailed above, see "An authorization method within an organization".

Thus, the security level of the permit is adapted to suit the requirements of each issuer of these digital documents. Any level of security may be achieved, either high or low, according to requirements.

Each permit may be granted by a different, independent entity. Each permit may be updated or canceled without interfering with the other permits. There are various mechanisms for canceling a permit, for example:

1. The permit includes an expiration date. Otherwise, the permit may include an issuing date and be valid for a specific time period starting on that issuing date.

2. Use of a black list at the gate. All canceled permits are included in the black list, and practically make the permit useless.

3. Issue updated permits from time to time. The new permit will be issued only to legitimate users at that time. All the previously issued permits become automatically obsolete. The gatekeeper is instructed to accept only the new permits.

The new permits may carry a new issue date or have a different type or format or some other identifiable difference from the previous, obsolete permits. A new regenerate type may be used.

4. A permit is issued to perform a specific activity, a specific number of times. For example, a permit is issued to generate 40 entry permits to the computer laboratory. The recipient issues these numbered entry permits, then the issuing permit is no more usable.

5. The permit issuer changes his encryption keys, that is the public and private keys. The new permits will be encrypted with the new private key by the permit issuer, and will be decrypted OK by the gatekeeper, using the new public key The old permits, however, being encrypted with the old, obsolete key, will not decrypt OK and will not be accepted. A legitimate user may ask for a new, updated permit from the permit issuer.

Method 3

Permit verification at entrance to facility

A. (Optional) A person asking to enter to XY Firm ask the gatekeeper for its permit "Permit to ask entry pass". According to the specific implementation, this step may be omitted, in which case the method starts at step (B) below;

B. If step (A) was performed, then the gatekeeper presents its "Permit to ask entry pass";

(Optional) the gatekeeper asks for the "entry pass";

C. the person asking to enter verifies the permit (by decrypting with the known, public key of XY Firm) ;

D. if the gatekeeper's permit is OK, then the person asking to enter presents his/her permit to enter and their certificate;

E. the gatekeeper checks the validity of the permit and certificate, and the correspondence between data items therebetween;

F. if the result of the gatekeeper's verification is positive, then the person is approved entry to XY Firm. End of method.

In the above method, a certificate presentation is accompanied by a challenge, that is the certificate holder is required to prove that he/she also holds the secret key corresponding to the public key in the certificate. This proves that the certificate holder is the true owner of that certificate.

In other embodiments, permits are used not to gain entry but to perform various other activities and/or make statements or include declarations or information or the like, as desired.

Thus, the abovedetailed structure and methods provide means for issuing permits 41, 42, 43 (see FIG. 1) and for using these permits to conditionally allow entry to a restricted area or the performance of specific activities, using encrypted digital messages.

If the permit 41 is issued to a person who serves as gatekeeper, then that person should have his own certificate, to attest to his/her identity. Authorities at XY Firm may check the certificate, then include details therefrom in the permit (in addition to data items 1–4 or 1–6 there). This is similar or identical to Method 2, used to issue permits for entry.

A person asking to enter the XY Firm facilities may then ask for the gatekeeper's permit to ask their entry pass, as well as the gatekeeper's certificate that he/she are indeed the gatekeeper for that facility.

Whereas in the abovedetailed methods the gatekeeper's permit is displayed unconditionally, in another variation of these methods, the gatekeeper's permit is only displayed after someone displays his/her certificate.

This provides protection for the gatekeeper's permit, and also allows for tracing, at a later time, entries or attempts at entry. To that purpose, the certificates are stored in memory at the gatekeeper, to identify those seeking entry to XY Firm.

There is no loss of time associated with this, since the employee's certificate is requested anyway also in Method 3, to compare details with those in the permit.

The implementation of this includes two steps (A1, A2) to replace step (A) of Method 3 above, and a modified step (B):

A1. A person seeking entry presents his/her certificate to a gatekeeper. This is understood as a request to the gatekeeper to present their permit to ask for the entry pass;

A2. The gatekeeper checks that this is a legitimate certificate. For example, it can be decrypted using the center's known public key, to check if it decrypts OK. The information regarding the identity of that person is stored in memory;

B. The gatekeeper presents its "Permit to ask entry pass", only if the result of the verification in step (A2) is positive.

The permitted activity (i.e. access to facility) is granted based on a dual check, the certificate to identify the pass holder, and the permit to allow a specific activity to that certificate holder.

In one embodiment of the invention, the permits have a local scope, defined within an entity where the public key for that entity is known and accepted. This allows for implementing a simple and effective system, wherein there is no need to access the center 2 during normal daily activities.

It is possible, however, to access center 2, for example in an emergency or in exceptional cases.

An example of an emergency situation may be the compromise of the private key for XY Firm, in which case anyone can forge permits there.

This can be addressed by the firm changing their public and private keys, with center 2 attesting to that change, as detailed in my prior application. A special case may be a key change initiated by XY Firm, regardless of the status of their keys.

The methods illustrated with reference to FIG. 1 are elaborated into the multilevel, hierarchical structure in FIG. 2 .

Figure 2:
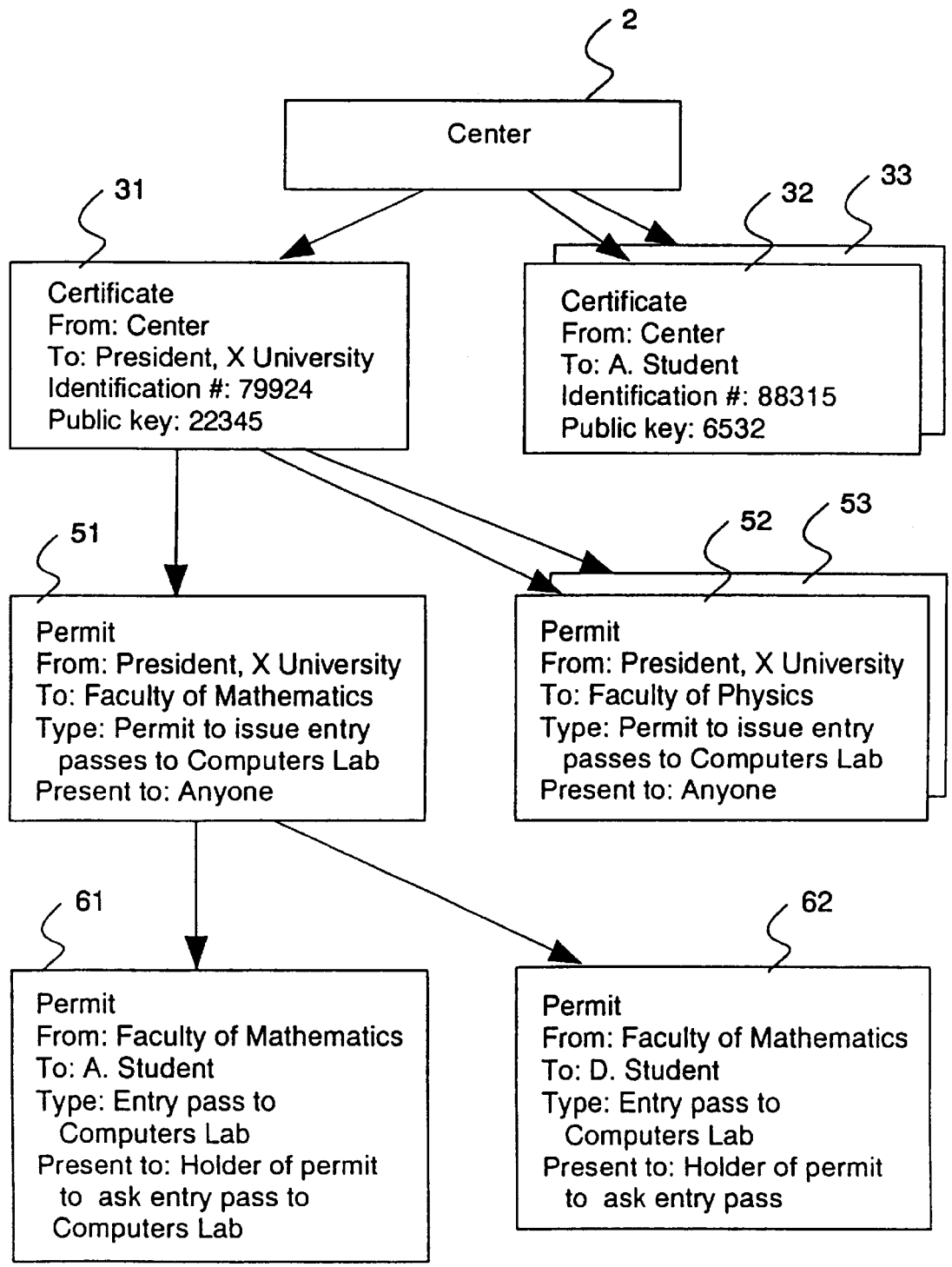
FIG. 2 illustrates a hierarchical method for issuing certificates and permits in a more complex application FIG. 3 details a method for issuing various types of permits.

Whereas in FIG. 1 there was one authority to issue all the permits exemplified as 41, 42, 43 there, in FIG. 2 there is a plurality of levels of permit-issuing authorities.

Thus, referring to FIG. 2, again center 2 includes means for encryption key dissemination among users, by issuing certificates, like certificates 31, 32, 33 , each including the identification and public key for a user. Each certificate is attested to with the digital signature of center 2. A user may be any entity, for example a private person, a commercial firm or an university.

Digital signatures used at center 2 may include encryption with the private (secret) key of center 2, as detailed above.

The private (secret) key of X University can then be used to create permits 51, 52, 53 at that university, each permit being granted to one faculty there.

The public key of X University, thus established with certificate 31, can be used to read the permits 51, 52, 53 by anyone.

The purpose of the permits 51, 52, 53 is to allow various activities within X University, or control the activities therein to include only those activities considered there to be legitimate. Although the example relates to an university, it is meant to illustrate control of activities at any organization.

In the present example, each of permits 51, 52, 53 allows to one faculty to issue entry passes to their students to the Computer Lab. Permits 51, 52 are granted to the Faculty of Mathematics and the Faculty of Physics, respectively, with more permits being granted each to another Faculty at X University.

The permits 51, 52, 53 are signed by the President of X University, for example by encryption with his/her private key. Anyone can decrypt the permit using the known public key for the President, to ensure the validity of each permit.

The President's known public key is backed up by certificate 31 from center 2, that certificate attesting to the public key there.

Each permit 51, 52 issued by the President to one Faculty, may also include, as an additional data item (not shown), the public key for that Faculty.

The permit thus also serves as a certificate to attest to the public key of the Faculty, backed up by the President of the University.

Another data item (not shown) which may be included in a permit 51, is the maximum number of entry permits (like 61, 62) which that Faculty is allowed to issue, say 50 permits. In another embodiment, permit 51 includes the range of serial numbers for entry permits to issue, for example between 1050 and 1059. The serial number for each permit actually being issued (permits 61, 62) can be checked against these limits.

A possible problem related to the use of permits is their use in a way exceeding the limitations set up by the issuing authority. For example, let us assume that a user B is given by authority M an authorization to issue 100 entry permits to a laboratory.

How can one verify that user B did not exceed his mandate limit by issuing more than 100 entry permits? Even though the issued permits may be numbered, user B may issue several permits with the same serial number. Authority M may be paid according to the number of issued permits or there may be other business considerations to limit the number of issued permits.

Accordingly, the present invention discloses a method for supervising the users who were given a permit, to ensure that the limitations of that authorization are not exceeded.

A method for accounting for issued permits

1. User B is given authorization to issue a specified number N of permits.
2. User B issues each permit while keeping records of that issuing, as follows:
   a) Each permit is given an unique serial number or identification alphanumeric string, for example a serial number from 1 to N.
   b) Each permit includes information relating to the identity of the recipient of that permit, like their name or identity number or student number or other information related to that person.
   c) User B keeps a record with information relating to each assigned permit including the permit's serial number and recipient's identity. In case that it is desired to keep confidential the contents of each permit, then the contents of the permit is encrypted with the public key of the recipient.
3. User B is under an obligation to respond to any inquiry, even an anonymous inquiry, regarding the details of each of the issued permits.

When receiving such an inquiry for an issued permit J, user B will answer with the information relating to that permit J. The response may be either en clair or encrypted, according to the specific implementation.

4. Any user may present an inquiry for his/her own permit, by indicating the serial number of that permit. If more than one permit having that number were issued, the issuer will not know which permit to send.

If the user receives a permit which is different than the original permit received, this indicates a multiple permits issuance. The user may then notify the permit issuing authority of this excess. The process may be automatic, with user's facilities being programmed to pose inquiries at random intervals, to compare the response with the correct permit, and to report any discrepancies to a designated authority, for example by sending a message to a predefined E-mail address. End of method.

In an alternative implementation of the verification step (4) above, the authority that gave the authorization to user B may present inquiries regarding various permits issued. Upon receiving the responses from user B, that authority will be able to verify that user B did not issue an exceeding number of permits, since each permit is assigned to a specific user and user B cannot mention more than one recipient to the permit number J. If two inquiries result in two different answers for the same permit number J, this is indicative of a multiple issuance of the same permit number J, that is a violation of the terms of the authorization given to user B. End of method In other words, user B will refrain from issuing a plurality of permits with the same serial number, since he/she knows that their actions are visible to users and/or the authority for those permits, and any such violation will show when an inquiry is made.

In a method where the identity of the inquirer is known to user B, user B could hide his excesses by issuing several permits number J (for example to users X, Y, Z) and answering to each user with the permit issued to that user (for example, presenting the permit issued to Z when user Z asks for details of the permit number J issued to him, and presenting the permit issued to X when user X asks for the permit number J that was issued to her).

This possibility is eliminated in the abovedetailed method, since user B is under obligation to answer to an anonymous inquiry, so that, if several permits with the same serial number J were issued to several users, user B will not know which of these permits to present to an anonymous inquirer.

Another advantage of the above method is that the contents of the permit is kept confidential, even from the entity that authorized user B to issue permits. This is achieved by the encryption with the public key of the person who received each permit. The authorizing entity will still be able to verify that only one permit was issued for each serial number, since each encrypted permit will have a different, unique contents.

In another embodiment of the above method, each permit is encrypted with both the public key of that permit's recipient and the public key of the entity that issued the permit to user B. This allows either the recipient or that higher authority each to read the permit in order to verify it. There are efficient methods known in the art for encrypting a message so that two different entities can read it, for example using a random key and encrypting that key with the public key of the first entity to achieve a first protected key, and with the public key of the second entity to achieve a second protected key. Both protected keys are attached to the encrypted permit.

In yet another embodiment of the above method, each permit is encrypted with the public key of user B, to create a record kept in file and presented to an inquirer. This may have the advantage that the record may be decrypted by user B in case this is necessary, without requiring the help of the recipient of the permit.

In the above method, the information relating to the recipient preferably includes information relating to that recipient's certificate. A digital certificate uniquely identifies a specific person, so that a permit together with that user's certificate may be used to grant that person the privileges as specified in that permit.

Since each person has a different certificate, the same permit cannot be issued to two persons since each has to use it with a different certificate.

Thus, if user B were to violate the terms of their authorization and issue more than one permit with the same serial number J, each such permit will have a different contents, to reflect the different certificate of each user. After encryption, the two permits will still be different. Thus, an anonymous inquirer will be capable of detecting the difference between permits having the same serial number, this difference being indicative of a violation of the permits issuing authorization by user B.

A possible exception may be that two permits may include two different dates of delivery to the user, since the same permit may have been given more than once to the same user, upon their request. Suitable means may be taken to take this into account.

It is possible that a specific permit was not issued yet. Thus, when user B is inquired about a specific permit number J, the answer will be either that the permit number J was not issued yet, or that it was issued together with the details of that permit as detailed above.

If the permit itself is confidential, it may be desired that the contents of the permit and/or the existence of that permit not be disclosed to all the users. This problem may be solved with a method wherein user B will answer each inquiry with a block of alphanumeric string, whether a permit was issued or not. In the former case, an encrypted copy of the permit will be issued, whereas in the latter case a random string will be sent.

To an unauthorized inquirer, the two cases will be indistinguishable, since he will not be able to decrypt the answer even if there is a valid permit therein. To a legitimate user, however, the answer will be readable and that user will be able to verify the permit to ensure that only one permit with that serial number was issued.

The answer from the permits issuer may be encrypted with the public key of the user intended to receive that permit, so that only that user will be able to read the permit.

The legitimate user will be able to read the permit and verify its contents, which are kept undisclosed from other users. If a permit issuer has delivered the same permit having the same serial number to several users, the permits issuer will not know which permit to present, since the identity of the inquirer is not known.

In another embodiment, the answer (the permit) is also encrypted with the public key of a higher level authority in the permits issuing hierarchy. This embodiment also allows to verify the integrity of the permits issuing entity, while keeping the contents of the permits themselves confidential.

An additional optional field in the permit is a "Yell address", that is an address for complaints in case a user detected an abuse in permits issuing, for example when an answer to an inquiry includes incorrect information. Such an inconsistency automatically triggers a reporting routine, wherein the user connect to the "Yell address" and sends a report regarding that permit . Such a report may include a copy of the received permit as an attachment. The "Yell address" may be an E-mail address, for example.

In a hierarchical permit authorization method, a permit may include several levels of authorization with information and signatures for each level of the permit issuing authorization. For each such level of authorization, an additional piece of information includes-the "Yell address" for a user to report abuses in permits issuing.

The above method allows to verify the permits issuers by the users, so that the permits issuer's actions are visible to all. Moreover, that goal is achieved while preserving the optional confidential nature of the permits themselves.

In another embodiment of the invention, user B is authorized to issue a specific number of records or information files to others. For example, a bookstore may be authorized to issue 200 electronic books, that is books in electronic format. A bookstore may be a conventional store or a server on the Internet, for example. The authorizing entity in this case may be the author or publisher of the electronic book. Of course, the author is interesting to keep track over the distribution of his/her book. The above method may be advantageously used to keep track of the number of electronic books thus disseminated.

Referring to FIG. 2, each Faculty can now issue entry permits, backed by the authorization from the President. Thus, the Faculty of Mathematics may issue entry permits like permits 61, 62, each to another student, based on permit 51 granted to that Faculty.

Each of permits 61, 62 is signed by the Faculty of Mathematics, for example by encryption with the private (secret) key of that Faculty. The corresponding public key for the Faculty should be backed up by a certificate (not shown) from a center issuing certificates.

Thus, permits 61, 62 can be decrypted by anyone at the University, to check their content and ensure their endorsement by that Faculty. Each of entry permits 61, 62 may include therein a copy of the permit 51 which gives authority to the faculty to issue that entry permit. This can be used to verify the validity of permit 62 (this is similar to the permit being signed by the Faculty and also by the President of the university).

This provides the option to trace each permit to source.

Accordingly, permit 61 includes two parts, each with a different encryption: the first part is the entry permit, encrypted with the private key of the Faculty, and the second part is the authorization to issue this entry permit, encrypted with the private key of the President of the University.

These two parts are actually two separate permits: the first is the permit to student for the desired activity or declaration, issued by the Faculty. The latter is proof that the Faculty has the authorization from the President of the University to issue the first permit to the student.

The student carries the two permits, to enable the verification of both facts: that the student is entitled to the activity in the permit, and that the permit was legitimately issued.

For example, the Faculty may be permitted to issue 50 permits, to be consecutively numbered 1 to 50. If the faculty issues more permits and the number of a permit is 51 for example, thus exceeding the maximum value of 50, then the gatekeeper may detect that and not accept the permit. The gatekeeper may otherwise check that the permit to student was issued by Faculty according to the permit granted to that Faculty. An effective method to verify that a Faculty does not exceed the allowed number of permits to be issued was disclosed above.

Similarly, other Faculties which received permits 52, 53 to issue entry permits may create entry passes for their students, using the same method as detailed above.

Each entry pass or permit is issued to a specific person, identified by their certificate, like certificates 32, 33 from center.

The permit granting process may include several hierarchical levels, for example the President of the University grants a first permit to issue permits to the Dean; the Dean issues second level permits to the various Faculties, based on that first permit. Each Faculty issues third level permits to students, each based on one of the second level permits.

The following Method 4 exemplifies the method for permits verification at a multilevel permit issuance facility, where there is a plurality of permit issuing authorities and a plurality of controlled entry locations.

The President of the University and the Faculty of Mathematics, are examples of permits-issuing authorities within the university entity. The Computer Lab is one example of a controlled-entry location.

Method 4

Permit verification at entrance to facility

A. the gatekeeper presents its certificate identifying him with that location, and their "Permit to ask entry pass" unconditionally, and asks for the "Entry pass".

The certificate and permit are encrypted with the private key of the President of the University;

B. a student asking to enter to the Computer Lab verifies that that is the desired location according to the certificate presented in (A) and/or the permit there is valid. The permit is decrypted with the public key of the University.

If satisfied, the student presents his/her certificate 32 to the gatekeeper, together with the required entry pass 61 there;

C. the gatekeeper checks the validity of certificate 32, for example by decrypting with the public key of center 2, and notes the name or identification of that student which is included in the certificate.

D. the gatekeeper decrypts the permit 61 using the known, public key of the Faculty of Mathematics. The identity of the student in the permit is compared with that in the certificate 32, which was presented in step (B) above;

E. if the decryption in (D) is OK, and the identity in the certificate 32 and permit 61 correspond, then the gatekeeper grants access to the Computer Lab to that student. End of method.

A variation of the above Method 4, step (A)—the permit of the gatekeeper is encrypted not with the private key of the University, but with the private key of the Faculty where the Computer Lab is located, say the Faculty of Mathematics.

The advantage is that the President of the university is not to bother about the management of each facility of each Faculty, but each Faculty manages its facilities. This would require that the Faculty has a permit from the President of the university to issue permits.

Figure 4:
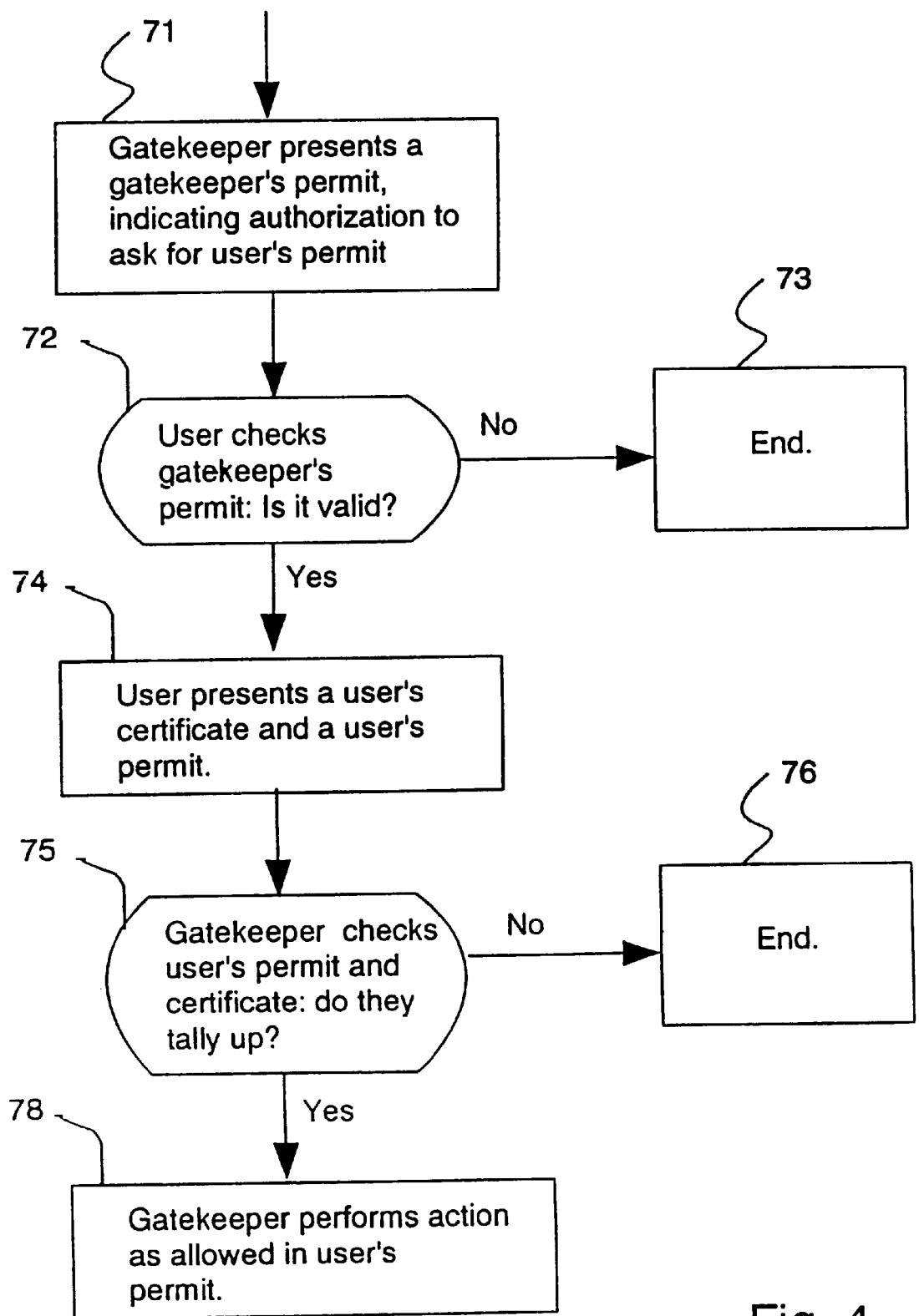
FIG. 4 illustrates a method for handling permits.

FIG. 4 illustrates a method for handling permits, that may be used as an embodiment of the abovedetailed Method 4.

The method comprises the steps of:

Step 71: a gatekeeper or a representative of an entity presents a gatekeeper's permit including an authorization to ask for a user's permit;

Step 72: a user checks the validity of the gatekeeper's permit and, if that permit is valid, then go to step 74, else go to step 73;

Step 73: END.

Step 74: the user presents two documents, comprising a user's permit and a user's certificate;

Step 75: the gatekeeper checks the validity of the user's permit and certificate, and the correspondence between data items therebetween. If the result of the validity check is positive, then go to step 78, else go to step 76.

Step 76: END.

Step 78: the gatekeeper performs a predefined action, wherein the action is related to the user's permit. End of method.

Preferably, the user's permit includes an electronic address to implement an electronic paper with a letterhead, where a recipient may connect to an issuing firm using the electronic address. The user's permit further includes a HTML (HyperText Markup Language) stamp, to allow automatic permit verification.

Figure 5:
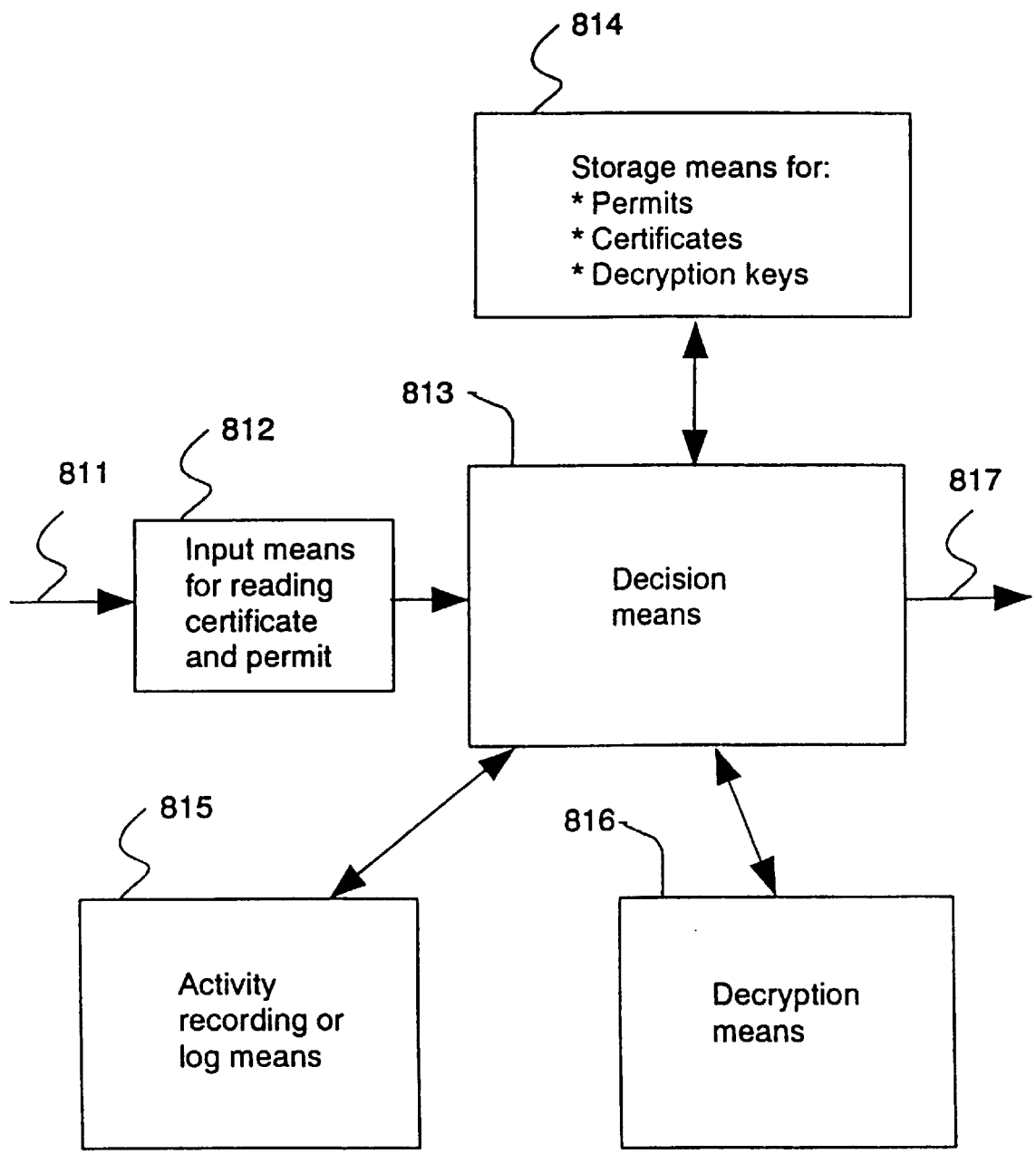
FIG. 5 illustrates a system for handling permits.

FIG. 5 illustrates a system for handling permits, that may be used to implement the above methods. The system includes input means 812 for reading a certificate and permit through input channel 811. Input means 812 may be implemented with a magnetic card reader, a smart cards reader or other input means.

A decision means 813 receives the information relating to permits and certificates and processes the information as required, using decryption means 816 to read encrypted information or to verify digital signatures. Decision means 813 may be implemented using a personal computer or other programmed device.

Storage means 814 may be used to store information relating to permits and certificates for a plurality of users. Decryption keys may be stored as well, as required.

If and when a positive decision is reached by the decision means 813, the output channel 817 is activated. The channel 817 may open a door or gate automatically, or may present a message to a person to indicate that a positive decision has been reached. The various activities performed may be logged using log means 815. Means 815 may include storage means like magnetic disks, or a printer to generate a hard copy record.

Another variation of the above Method 4, would include the following steps to replace step (D) there:

D1. the gatekeeper decrypts the second part of permit 61, that is a copy of permit 51 with the authorization to issue the entry permit. It is decrypted with the known key of the President;

D2. the decrypted message in (D1) contains the information that the student belongs to the Faculty of Mathematics, and the public key for that Faculty;

D3. the first part of permit 61, that is the entry permit itself, is now decrypted with the public key of the Faculty of Mathematics, the key which was found in step (D2) The identity of the student in the permit is compared with that in the certificate 32, which was presented in step (B) above.

The permit may be either encrypted or signed by the permit issuer.

In the latter option, the permit is not encrypted, but is made secure with a digital signature which is prepared and added to the permit.

Each signature includes a hash of the permit, encrypted with the private key of the permit issuer.

This novel aspect of the present invention allows for handling certificates, permits and encryption keys. The method facilitates the coordination between the various departments of a large organization, regarding the issuance and handling of permits. Similarly, the method can be used between people in separate organizations and/or as individuals.

Figure 3:
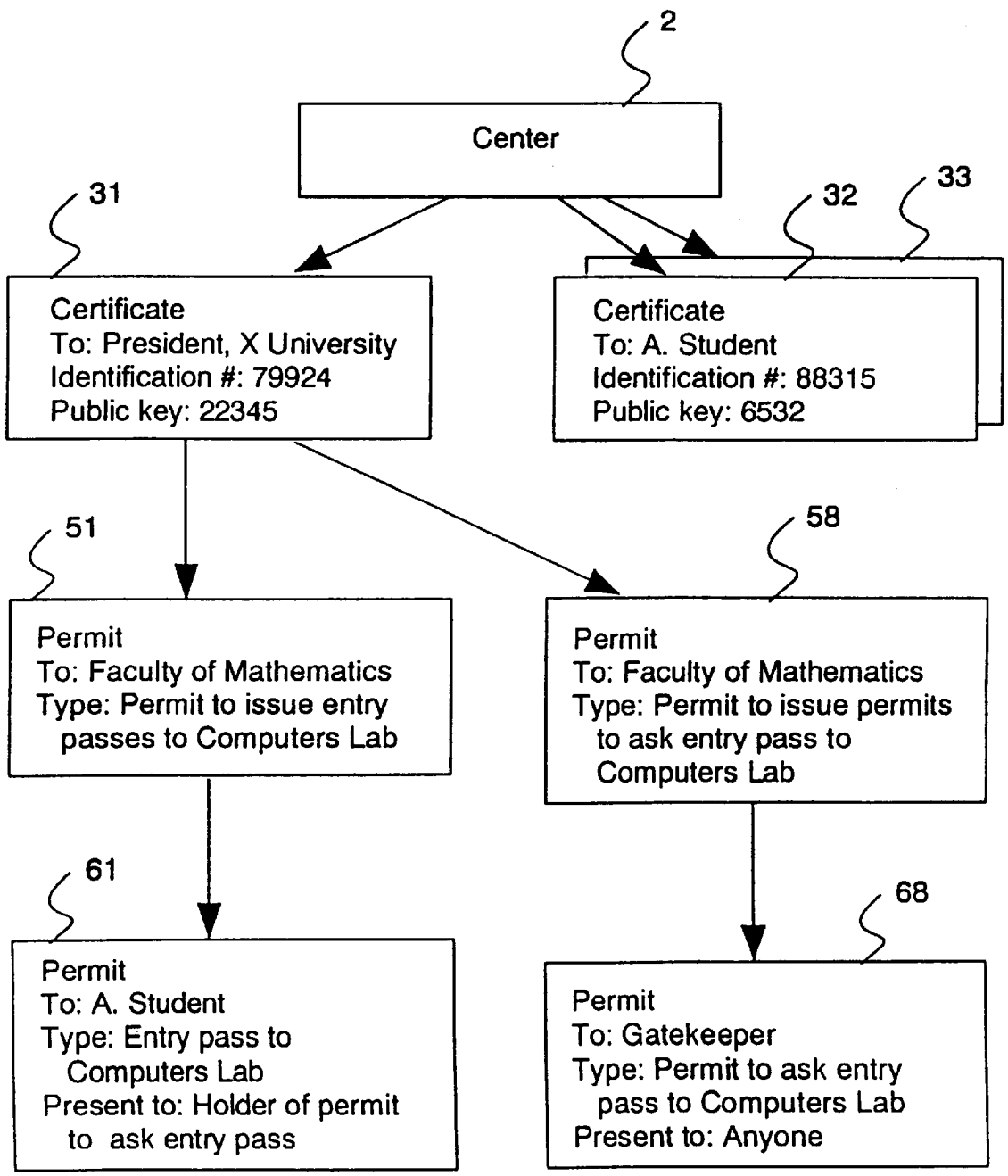

FIG. 3 details a method for issuing various types of permits. All the participants, including organizations and individuals, can interact with each other and perform mutual identification using certificates 31, 32, 33 issued by center 2.

The President of X University may issue various permits like permits 51, 58, to the various Faculties or each permit to a different activity at the same Faculty.

Permit 51 may be used to issue entry permits, like permit 61 which relates to the Computer Lab; permit 58 may be to issue permits to ask the entry pass, like permit 68. Other permits (not shown) may be used for still other purposes, for example to allow entry to the High Voltage Lab, etc.

Thus, the method disclosed in the present invention allows for the issuance of permits by the various faculties within an university, and the recognition and honoring of permits issued by any faculty, in any other faculty there. The president may also issue certificates to the various Faculties, attesting to their public keys, to support the permits issued and signed by those Faculties.

A permit, like permit 68 to ask the entry pass, may be assigned to a fixed location, for example using a card reader installed at the Computer Lab. This can serve to prompt students to present their entry passes.

The permit may also be used for the students to ensure that that location is indeed the Computer Lab, that is the student arrived at the right location.

Still another use of such an installation is to automatically record students' attendance, where the information regarding the entry of each student is recorded in some computer means.

In such a complex environment, a method for initiating a new student with all the required permits may involve a procedure as follows:

Method 5

Issuance of initial permits to a new student

A. A student arriving for the first time to the university (after being accepted there to a specific Faculty, for a specific program), is issued a temporary permit by the university.

This permit is presented by the student, together with his/her certificate 32, to the gatekeeper;

B. the gatekeeper checks the validity of certificate 32, for example by decrypting with the public key of center 2, and notes of the name or identification of that student which is included in the certificate;

C. if the certificate 32 decrypted OK, then the gatekeeper presents the certificate 31 of the university, with the public key there to be noted by student, and allows the student in;

D. the student goes to the Faculty of Mathematics (assuming he is enlisted there) and presents his certificate to the gatekeeper there;

E. initial mutual identification between the Faculty and the student is performed, by presenting their certificates to each other. Thus, staff at the Faculty ascertain that this is the new student who was expected there, and the student ensures he/she has arrived at the right Faculty;

F. upon successful completion of step (E) above, the Faculty issues to the student all the permits required, according to the courses that student has enlisted to, and the curriculum at the Faculty. Thenceforth, the student has in his/her possession all the permits required for their studies at the Faculty. End of method.

Figure 6:
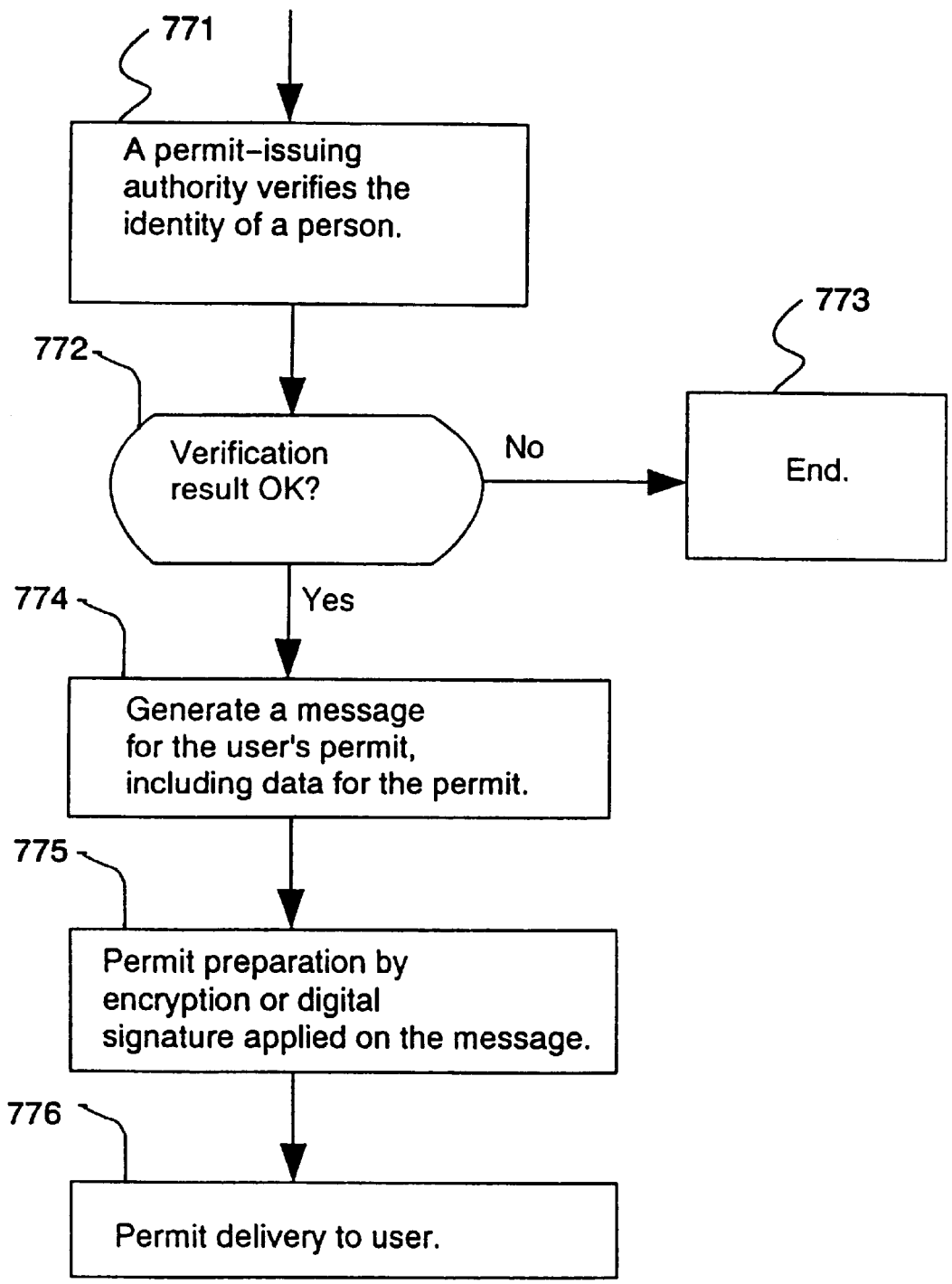
FIG. 6 illustrates a method for the generation of permits.

FIG. 6 illustrates a method for the generation of permits, that may be used as a possible embodiment of the above Method 5. The method includes the following steps:

Step 771: A permit issuing authority verifies the identity of a person using a digital certificate presented by that person;

Step 772: is the result OK? if yes, go to step 774, else go to step 773;

Step 773: END.

Step 774: the permit issuing authority generates a message for the user's permit, wherein the message includes data items to indicate:

(1) Who issued the permit, that is the issuing authority identification;

(2) To whom was the permit issued, as indicated in the digital certificate;

(3) Type of permit, that is the action that is allowed by the permit;

(4) a HTML (HyperText Markup Language) stamp;

Step 775: a permit is prepared by encrypting the message prepared in step 772 above or adding a digital signature to the message, wherein the encryption is performed using a private encryption key;

Step 776: delivering the permit to the person who has been identified with his/her certificate, and whose details from that certificate are included in the permit. End of method.

Note

In an automated environment, Method 5 can be performed in less than one second. Thus, the methods disclosed in the present invention allow for fast and efficient issuing and use of permits.

In another embodiment, a permit may include medical information for the permit holder, to be read in an emergency. The information is encrypted, to preserve the privacy of the person. An ambulance team or other medical personnel may have a permit to read that information.

In another embodiment of the present invention, permit technology may be used to provide "electronic stationery" or "electronic paper". At present, when E-mail or other electronic document is received, one cannot tell whether it originated at a specific firm, like IBM or General Electric for example.

In paper documents this is possible, since the document carries a letterhead with the details of that firm.

Permits may be used to create electronic paper with letterhead, as detailed in the following method.

Method for creating electronic paper with letterhead using permits

A firm issues permits to certain employees to write letters on the company's letterhead. The letterhead may include details on the firm like name, address, business activities. The letterhead may also indicate the name and position of that employee, with optional telephone and fax numbers.

Thus, the recipient is informed of the firm where the letter originated, as well as the position of the writer in that firm. This is important information in business, both to sender and recipient.

The permit may include the above information, signed or encrypted with the private key of that firm. The recipient may verify the permit, as detailed elsewhere in the disclosure.

The firm may give each employee a permit to issue mail with its letterhead, with an optional limit to the letters allowed to send. The letterhead may also include a logo of the firm and/or a specific division there.

A more advanced feature in electronic paper is the inclusion of an electronic address for the issuing firm, to enable the recipient to contact the firm for approval of the permit. The authorization of the permit may then be displayed, together with updated items in the permit, the position of the letter writer and optional additional information.

The firm may be contacted for example on the Internet, over the World Wide Web (WWW).

In one embodiment of electronic paper, it may include a HTML (HyperText Markup Language) stamp. The HTML stamp may be used in an E-mail environment to automatically access the issuing company, when a recipient clicks on that stamp.

The issuing company can then, in real time, acknowledge and approve the permit. All this can be done automatically, in a computer to computer transaction using the Internet for example. The transaction is fast, efficient and low cost, without human intervention.

A system for handling permits may perform various activities, according to the type of permits handled thereat. These activities may include, but not limited to, granting entry access to the permit holder, displaying the information in the permit to an authorized person, issue instructions or present information based on the information in the permit.

It will be recognized that the foregoing is but one example of an apparatus and method within the scope of the present invention and that various modifications will occur to those skilled in the art upon reading the disclosure set forth hereinbefore.

What is claimed is:

1. A method for handling permits, comprising the steps of:
   (A) a user presents two documents, comprising a user's permit and a user's certificate, wherein the permit includes a HTML (HyperText Markup Language) stamp;
   (B) a gatekeeper checks the validity of the user's permit and certificate, and the correspondence between data items therebetween, and performs a predefined action if the result of the validity check is positive, wherein the action is related to the user's permit, and wherein the HTML stamp is used for automatic permit verification.

2. The method for handling permits according to claim 1, wherein the user's permit includes data items indicating the identity of an entity which has issued the permit.

3. The method for handling permits according to claim 1, wherein the user's permit includes data items indicating actions that are allowed by the permit.

4. The method for handling permits according to claim 1, wherein the user's permit includes data items indicating a serial number of permit, date issued and an expiration date.

5. For a method for handling permits, comprising the steps of:
   (A) a gatekeeper or a representative of an entity presents a gatekeeper's permit including an authorization to ask for a user's permit;
   (B) a user checks the validity of the gatekeeper's permit wherein, if the validity result is positive, then go to step (C);
   (C) the user presents two documents, comprising a user's permit and a user's certificate;
   (D) the gatekeeper checks the validity of the user's permit and certificate, and the correspondence between data items therebetween, and performs a predefined action if the result of the validity check is positive, wherein the action is related to the user's permit; and wherein the user's permit includes an electronic address to implement an electronic paper with a letterhead, where a recipient may connect to an issuing firm using the electronic address, and wherein the user's permit further includes a HTML (HyperText Markup Language) stamp, to allow automatic permit verification.

6. A method for generating a user's permit, comprising the steps of:
   (A) A permit issuing authority verifies the identity of a person using a digital certificate presented by that person wherein, if the verification result is positive, then go to step (B);
   (B) the permit issuing authority generates a message for the user's permit, wherein the message includes data items to indicate:
      (1) Who issued the permit, that is the issuing authority identification;
      (2) To whom was the permit issued, as indicated in the digital certificate;
      (3) Type of permit, that is the action that is allowed by the permit;
      (4) a HTML (HyperText Markup Language) stamp;
   (C) a permit is prepared by encrypting the message prepared in step (B) above or adding a digital signature to the message, wherein the encryption is performed using a private encryption key; and
   (D) delivering the permit to the person who has been identified with his/her certificate, and whose details from that certificate are included in the permit.

7. The method for generating a user's permit according to claim 6, wherein the permit further includes data items to indicate a serial number of permit and a date issued.

8. The method for generating a user's permit according to claim 6, wherein the permit further includes data items to indicate an expiration date.

* * * * *